(12) United States Patent
Kim

(10) Patent No.: US 7,816,417 B2
(45) Date of Patent: Oct. 19, 2010

(54) WATER SOLUBLE PHOTO-CURABLE ANTISTATIC COMPOUND WITH IMPROVED WEAR RESISTANCE AND HIGH TRANSPARENCY AND CONDUCTIVE HARD TILE FLOORING MATERIAL COATED WITH THE SAME

(76) Inventor: Chae-Ho Kim, #28-1 Gwacheon-Dong, Gwacheon-Si, Gyeonggi-Do (KR) 427-060

( * ) Notice: Subject to any disclaimer, the term of this patent is extended or adjusted under 35 U.S.C. 154(b) by 233 days.

(21) Appl. No.: 12/073,725

(22) Filed: Mar. 10, 2008

(65) Prior Publication Data

US 2009/0186959 A1 Jul. 23, 2009

(30) Foreign Application Priority Data

Jan. 17, 2008 (KR) .................. 10-2008-0005258

(51) Int. Cl.
*C08K 3/04* (2006.01)
*C08K 3/36* (2006.01)
(52) U.S. Cl. ................. 522/71; 522/84; 522/85; 524/493; 524/495; 977/778; 977/779
(58) Field of Classification Search ............. 522/71, 522/84, 85; 977/778, 779; 524/492, 493, 524/495, 496
See application file for complete search history.

(56) References Cited

U.S. PATENT DOCUMENTS

| | | | |
|---|---|---|---|
| 6,528,572 B1 * | 3/2003 | Patel et al. ............... 524/495 |
| 6,617,377 B2 * | 9/2003 | Chacko ...................... 524/99 |
| 7,122,585 B2 * | 10/2006 | Nicholl et al. ............ 523/205 |
| 7,153,903 B1 * | 12/2006 | Barraza et al. ............ 524/847 |
| 7,527,753 B2 * | 5/2009 | Hiroshige et al. ......... 252/518.1 |
| 2005/0228097 A1 * | 10/2005 | Zhong ..................... 524/430 |
| 2005/0271881 A1 * | 12/2005 | Hong ..................... 428/423.1 |
| 2007/0074216 A1 * | 3/2007 | Adachi et al. ............ 718/102 |
| 2008/0281014 A1 * | 11/2008 | Momose et al. ........... 522/71 |

* cited by examiner

*Primary Examiner*—Susan W Berman
(74) *Attorney, Agent, or Firm*—G W i P S

(57) ABSTRACT

A water soluble photo-curable antistatic resin compound has developed to improve the wear resistance and high transparency comprising: 5~15 wt % of fine conductive particles containing carbon nanotubes, 0.1~5 wt % of fumed silica, 10~20 wt % of water soluble acrylate based oligomer, 20~75 wt % of mono-functional monomer or multi-functional monomer, 0.1~5 wt % of photo-polymerization initiator, 0.1~5 wt % of additive including at least one selected from a group consisting of adhesion enhancer, dispersing agent, defoaming agent, leveling agent; and 50~150 parts by weight of pure water relative to the total 100 weight of the above ingredients. The water soluble photo-curable antistatic resin compound is coated to the conductive hard tile having double-layer lamination, such as a general rubber or PVC to improve the wear resistance. The antistatic resin compound has properties sufficient to overcome the restrictions of conventionally available conductive tile flooring, and express at least 80% of the original colors of the flooring.

3 Claims, No Drawings

WATER SOLUBLE PHOTO-CURABLE ANTISTATIC COMPOUND WITH IMPROVED WEAR RESISTANCE AND HIGH TRANSPARENCY AND CONDUCTIVE HARD TILE FLOORING MATERIAL COATED WITH THE SAME

BACKGROUND OF THE INVENTION

1. Field of the Invention

The present invention relates to conductive hard tile flooring materials coated with a water soluble and photo-curable antistatic resin having excellent wear resistance and transparency and, more particularly, to a water soluble and photo-curable antistatic compound with improved wear resistance and high transparency for hard coating, as well as a conductive tile flooring material having a double-layer laminated structure coated with the antistatic compound, so that the flooring material can protect the surface of a conductive tile flooring against external wear, inhibit electrostatic discharge damage and transmit at least 80% of the original color of the conductive tile flooring.

2. Description of the Related Prior Art

Since higher-level integration of electronic parts and/or semiconductor devices has historically caused a significant problem in relation to failure of such products, many studies and efforts have been performed in order to considerably reduce electrostatic discharge failures of electronic parts and/or semiconductor devices.

Electrostatic discharge generated by workers in processes of manufacturing, assembling, packaging and/or delivering electronic parts, or in working environments with packaging materials and/or various instruments as well as fine particles such as dust deposited onto electronic parts and products (hereafter referred to as "electronics"), have become a more frequent cause of failure of the electronics.

Therefore, storage and delivery cases required for manufacturing or assembling electronics, as well as the entire surroundings of a working place including the floor must have antistatic performance. In order to protect electronics and/or semiconductor devices in the manufacturing environment, a clean-room system is well known to remove fine particles including dust. However, conventional conductive tile flooring materials for clean-room installations, which are usually prepared of rubber or PVC (polyvinyl chloride) resin, are susceptible to wear caused by dropping of instruments or other things, generating fine wear particles, so that the clean-room does not play its important role in manufacturing of electronics and/or semiconductor devices.

Conductive tile flooring materials are well known in prior arts including, for example: Korean Patent No. 10-427554, entitled "PVC carpet tile using carbon black and the method of manufacturing thereof", which disclosed a conductive PVC carpet tile with a laminated structure of PVC resin layer containing carbon black, a glass fiber layer, a non-woven fabric layer, a fiber layer woven with carbon black containing yarns, etc.; and Korean Patent No. 10-589279, entitled "Conductive marble flooring and method of making the same by a continuous process", which disclosed a decorative flooring with marble effect and stable conductivity obtained by a uniform composition of conductive carbon black and back-printing the rear side of the flooring with conductive carbon black ink. Briefly, the conductive flooring materials reported in these documents achieve their antistatic property by application of carbon black or through a fiber layer woven of yarns containing carbon fiber.

However, such flooring materials necessarily lead to the generation of fine wear particles due to the limited wear resistance of conductive tiles made of plastic such as rubber or PVC, and thus are not eco-friendly, not effective, and may lead to operational failure of electronic devices and parts.

Also, photo-curable coating compounds are well known in prior arts that include, for example: Korean Patent No. 10-246036, entitled "Anti-static and abrasion resistant UV curable acrylic coating composition", which disclosed a UV curable coating compound containing conductive microfine particulate sol; Korean Patent No. 10-373207, entitled "Light curable anti-static and abrasion resistant coating composition", which disclosed a coating compound comprising fine conductive particles as well as mono-functional and multi-functional acrylate monomers; and Korean patent application No. 2002-7013227, entitled "Composition for antistatic coat, antistatic hard coat, process for producing the same, and multilayered film with antistatic hard coat", which disclosed an antistatic hard coating compound prepared by adding fine conductive particles with a diameter of 10 to 30 nm to multi-functional acrylate together with a silicon compound. The photo-curable resin compounds claimed in the above documents are for improvement of coating characteristics such as antistatic property and wear resistance, etc. But, due to excess charging of the fine conductive particles, these compounds cannot endow transparency to an oligomer comprising, for example, acrylate as a primary ingredient.

SUMMARY OF THE INVENTION

Accordingly, the present invention is directed to solve the problems of conventional methods as described above and an object of the present invention is to provide a conductive tile flooring material having a double-layer laminated structure which comprises conductive tile and a transparent coating layer capable of expressing at least 80% of the original color of the conductive tile, so that it represents a noticeable improvement of wear resistance to greatly inhibit the generation of fine wear particles while maintaining antistatic properties substantially equal to or better than that of the conductive tile.

Especially, the present invention provides a water soluble photo-curable antistatic resin compound, comprising: in relation to total weight of the composition, 5 to 15% by weight ("wt %") of fine conductive particles containing carbon nanotubes; 0.1 to 5 wt % of fumed silica; 10 to 20 wt % of water soluble acrylate; 20 to 75 wt % of monomer mixture including mono-functional monomer and multi-functional monomer in relative ratio by weight of 1:1 or less; 0.1 to 5 wt % of photo-polymerization initiator; 0.1 to 5 wt % of additive including at least one selected from a group consisting of adhesion enhancer, dispersing agent, de-foaming agent, leveling agent and the like; and 50 to 150 parts by weight of pure water relative to the total 100 weight of the above ingredients. The fine conductive particles contain carbon nanotubes in the range of 4 to 80 wt %.

Although the conductive tile flooring material with a double-layer laminated structure of the present invention includes the photo-curable resin compound prepared using pure water as a solvent, the flooring material represents superior formation of a coating film and surface smoothness, excellent wear resistance resulting from the activity of a surface coating layer comprising the photo-curable resin as a protective layer to prevent wearing of the conductive tile, and conductivity equal to or more than that of the conductive tile, thereby effectively expressing improved antistatic properties. In addition, the tile flooring material has a double-layer laminated structure which is composed of a coating layer formed by the photo-curable coating compound of the present invention with at least 80% transparency, as well as a conductive tile, so that it can freely express the original color of the conductive tile and improve the wear resistance of the conductive tile, effectively inhibiting the generation of fine wear particles.

The antistatic coating layer described above has a very small thickness of about 3 to 7 μm and is water soluble so as to make the flooring material eco-friendly and harmless to the human body during the coating process.

In order to accomplish the above objects, an aspect of the present invention is to provide a water soluble photo-curable antistatic coating compound, characterized by a specific constitutional composition corresponding to that of commonly known water soluble photo-curable resin compounds, electric resistance of not more than 10Ω (ohms) measured by ASTM F 150 standards and generation of not more than 0.1 g of wear particles measured by ASTM D 3389 standards and which principally comprises 5 to 15 parts by weight of fine conductive particles containing 0.004 to 80 wt % of carbon nanotubes and 0.1 to 5 parts by weight of fumed silica.

Another aspect of the present invention is to provide a conductive tile flooring material with a double-layer laminated structure prepared by applying the water soluble photo-curable resin compound of the present invention to a conductive tile with a thickness of 3 to 7 μm.

DETAILED DESCRIPTION OF THE INVENTION

These and other objects, features, aspects, and advantages of the present invention will be more fully described in the following detailed description.

The conductive tile flooring material with a double-layer laminated structure prepared by application of the water soluble photo-curable antistatic compound according to the present invention endows semi-permanent antistatic properties to typical conductive tile and has excellent wear resistance and transparency.

According to the present invention, the coating compound is water soluble and uses pure water as a solvent so as to be eco-friendly and harmless to the human body. In addition, because of excellent wear resistance and antistatic properties, the coating compound can continuously maintain or improve its original characteristics such as physical properties and enhance the durability and antistatic properties of a conductive tile flooring material, and further considerably inhibit generation of dust particles from the same.

As clearly understood from the above description and the following preferred embodiments of the present invention, the conductive tile flooring material having a double-layer laminated structure coated with the water soluble photo-curable resin compound of the present invention represents improved wear resistance and antistatic properties, and expresses at least 80% of the original color of the conductive tile to form the tile flooring material.

Furthermore, the water soluble photo-curable coating compound comprising conductive fine particles and carbon nanotubes according to the present invention uses pure water as a solvent so as to be eco-friendly and harmless to the human body during handling and processing, and can greatly reduce generation of fine dust particles caused by wear. The conductive tile flooring material with a double-layer laminated structure will be more particularly described as follows.

(1) Water Soluble Photo-curable Antistatic Resin Compound

The water soluble photo-curable antistatic resin compound of the present invention has the following specific constitutional composition:
1. fine conductive particles containing carbon nanotubes, 5 to 15 wt %;
2. fumed silica, 0.1 to 5 wt %;
3. water soluble acrylate based oligomer, 10 to 20 wt %;
4. mono-functional and/or multi-functional monomer, 20 to 75 wt %;
5. photo-polymerization initiator, 0.1 to 5 wt %;
6. at least one additive selected from a group consisting of: adhesive enhancer, defoaming agent, leveling agent, wetting and dispersing agent, stabilizer, fine particle dispersing agent and the like, in a total concentration of 0.1 to 5 wt %;
7. pure water as a solvent, 50 to 150 parts by weight relative to the total 100 parts by weight of all of the above ingredients.

The fine conductive particles may further include antimony-doped zinc oxide (ATO), indium-doped tin oxide (ITO), antimony-doped zinc oxide (AZO), etc. instead of or in addition to carbon nanotubes. The fine conductive particles have a diameter in the range of 5 to 200 nm and, preferably, an average particle diameter of not more than 50 nm. Also, at least 60% of the total number of particles preferably have a distribution of particle diameters within 100 nm.

If the particle diameter is not under the above conditions, the fine particles cause light scattering and loss of transparency.

Carbon nanotubes can be either single-walled, double-walled and/or multi-walled nanotubes.

The fine conductive particles must contain carbon nanotubes in the range of 0.004 to 80 wt %. If the content of carbon nanotubes is less than 0.004 wt %, the coating compound does not have sufficient antistatic effect. On the other hand, for more than 80 wt % of carbon nanotubes, the coating compound cannot ensure more than 80% transparency for the flooring material when measured by means of a UV spectrometer.

The form of the carbon nanotubes is not particularly limited but preferably includes, for example: carbon nanotubes treated in a strong acidic and/or basic solution such as nitric acid, a mixture of nitric acid and sulfuric acid, hydrogen peroxide, a mixture of hydrogen peroxide and ammonium hydroxide, etc.; surface modified carbon nanotubes by an organic compound such as imidazole, amine, acryl, etc.; carbon nanotubes heated at 400° C. or more for at least 2 hours; and carbon nanotubes in their original state without alternative treatment, in order to exhibit desired features. Preferably, the carbon nanotubes are carbon nanotubes treated with strong acid or base. More preferably, surface modified carbon nanotubes provide maximum effect with minimum content of the carbon nanotubes.

Fumed silica as one of the essential ingredients has an average coagulation size of not more than 0.2 μm. And, content of the fumed silica preferably ranges between 0.1 and 5 parts by weight. If the content of the fumed silica is less than 0.1 parts by weight, the flooring material cannot have the desired wear resistance. On the other hand, for more than 5 parts by weight of the fumed silica, the coating compound has increased viscosity causing reduction of coating characteristics to conductive tiles.

Other ingredients are also essential to prepare the water soluble photo-curable resin compound according to the present invention, which include, for example: 10 to 20 wt % of water oligomer such as epoxy or urethane based acrylate oligomer; 20 to 75 wt % of monomer mixture including mono-functional and multi-functional monomers in relative ratio by weight of 1:1 or less; 0.1 to 5 wt % of photo-polymerization initiator such as hydroxycyclohexylphenylketone, benzophenone, etc.; and 0.1 to 5 wt % of at least one additive selected from a group consisting of adhesion enhancer, defoaming agent, leveling agent, wetting and dispersing agent, stabilizer, fine particle dispersing agent and the like. The resin compound preferably contains pure water as the solvent in the range of 50 to 150 parts by weight relative to the total 100 parts by weight of all of the above ingredients, in consideration of coating characteristics such as viscosity.

(2) Coating of Conductive Tile with Water Soluble Photocurable Resin Compound

The water soluble photo-curable resin compound of the present invention can be applied to conductive tiles by generally known processes such as spray coating, gravure coating, roll coating, bar coating, etc. The coating film preferably has a thickness of 5 to 10 μm. If the thickness of the coating film is less than 5 μm, pure water is removed during the UV curing process described below, causing a reduction of thickness in response to the removed amount of pure water. As a result, the conductive tile flooring material cannot continuously have the desired antistatic properties and may be partially uncoated. On the other hand, when the tile flooring material is coated with the resin compound with a thickness of more than 10 μm, the tile flooring material has reduced scratch resistance causing poor appearance and generation of fine wear particles. After completely drying, a coating layer formed by the resin compound preferably has a thickness of 3 to 7 μm.

For UV irradiation to cure the resin ingredient, UV energy sources useable in the present invention include, for example, high pressure mercury lamps, halogen lamps, xenon lamps, nitrogen lasers, etc. The radiation dose of the UV energy beam preferably ranges from 50 to 3,000 mJ/cm2 accumulated at 365 nm. If the UV energy delivered is less than 50 mJ/cm2, the resin compound is not sufficiently cured, causing reduction of wear resistance and/or scratch resistance. On the contrary, when the radiation dose is more than 3,000 mJ/cm2, yellowing of the tile flooring material is observed, resulting in poor transparency.

The conductive tile flooring material of the present invention is prepared using various formed products such as sheet or injection molded articles based on thermoplastic and/or thermosetting plastic materials which may include, for example, PVC, ABS (acrylonitrile butadiene styrene), PMMA (polymethyl methacrylate), PP (polypropylene), rubber resin, etc. The conductive tile flooring material must have an electric resistance of less than 109Ω as measured by ASTM F 150 standards, and wear particle generation of not more than 0.6 g per 1,000 cycles as measured by ASTM D 3389 standards. When the above characteristics are not within the defined values, it is substantially difficult to achieve the desired coating effect even when the conductive tile flooring material includes a coating film formed by the water soluble photo-curable resin compound according to the present invention.

The conductive tile flooring material having a double-layer laminated structure coated with the water soluble photo-curable antistatic compound of the present invention has improved wear resistance and antistatic properties. In addition, the water soluble photo-curable resin compound of the present invention with high transparency sufficiently expresses the original colors of tile floorings commercially available in the market. Therefore, it is usefully applied to the manufacture of conductive tile flooring materials for cleanroom installations, antistatic packaging materials, etc.

Hereinafter, the present invention will be more particularly described by examples. However, these are intended to illustrate the invention as preferred embodiments of the present invention and do not limit the scope of the present invention and accompanying claims.

EXAMPLE 1

Mixing all of the ingredients listed in Table 1, below, a water soluble photo-curable antistatic coating compound with favorable wear resistance and transparency was prepared. As a water soluble oligomer ingredient of the coating compound, urethane acrylate having polyethyleneglycol as the main chain was used. The coating compound further included a monomer including caprolactone as a mono-functional group and hexanediol diacrylate as a di-functional group. For the coating compound, a water dispersible ATO solution available from Ishihara Co., Japan and multi-walled carbon nanotubes available from Iljin Nanotech, Korea, were used as fine conductive particles and a carbon nanotube ingredient, respectively.

Furthermore, as a fine conductive particle dispersing agent containing carbon nanotubes, sodium dodecylsulfate (SDS) was dispersed by means of ultrasonic dispersion processes. The photo-polymerization initiator utilized was made up of ketones such as 1-hydroxycyclohexylphenylketone and benzophenone. Fumed silica contained in the compound was an aqueous dispersion available from Degussa. The coating compound further included other ingredients in small amounts including, for example, a defoaming agent, a wetting and dispersing agent and a leveling agent. Pure water used as a solvent contained pure water and fumed silica, and the amount of the pure water was controlled to 1:1 relative to all ingredients of the compound, in terms of (parts by weight of pure water): (total parts by weight of other ingredients including organic and inorganic components in the compound). In Table 1, the concentrations of all ingredients including pure water are indicated in percent by weight for illustrative convenience.

The prepared coating compound was applied to a conductive tile specimen made of PVC resin with dimensions of 10 cm×10 cm, followed by treating the specimen in a vacuum dryer at 80 degrees C. for 5 minutes to remove bubbles and residual traces of the solvent. The tile specimen coated with the compound was subjected to irradiation of 1,000 mJ/cm2 by means of a mercury lamp to form a cross-linking cured film on the surface of the specimen.

EXAMPLE 2

The same procedure described in Example 1 was performed except that the concentrations of both the carbon nanotubes and the fumed silica were altered.

COMPARATIVE EXAMPLE 1

The same procedure described in Example 1 was performed except that carbon nanotubes were not added.

COMPARATIVE EXAMPLE 2

The same procedure described in Example 1 was performed except that fumed silica as a wear resistance enhancer was not added.

COMPARATIVE EXAMPLE 3

The same procedure described in Example 1 was performed except that neither carbon nanotubes nor fumed silica were added.

COMPARATIVE EXAMPLE 4

The conductive tile flooring material of the present invention was compared to a control which was not coated by the water soluble photo-curable resin compound according to the present invention.

COMPARATIVE EXAMPLE 5

The same procedure described in Example 1 was performed except that the amount of pure water was altered to 40 parts by weight relative to the total 100 parts by weight of all ingredients including organic and inorganic components in the coating compound.

COMPARATIVE EXAMPLE 6

The same procedure described in Example 1 was performed except that the amount of pure water was altered to 160 parts by weight relative to the total 100 parts by weight of all ingredients including organic and inorganic components in the coating compound.

TABLE 1

| Ingredients | | Constitutional compositions (wt %) | | | | | |
|---|---|---|---|---|---|---|---|
| | | Example | | Comparative Example | | | |
| | | 1 | 2 | 1 | 2 | 3 | 4 |
| Conductive fine particles | ATO | 5.0 | 5.0 | 5.0 | 5.0 | 5.0 | — |
| | Multi-walled carbon nanotubes | 0.5 | 1.5 | 0 | 0.5 | 0 | — |
| Wear resistance enhancer | Fumed silica | 1.0 | 0.5 | 1.0 | 0 | 0 | — |
| Urethane acrylate oligomer | WS-4000 | 21 | 21 | 21 | 21 | 21 | — |
| Mono-functional monomer | Caprolactone acrylate | 5.5 | 5.0 | 6.0 | 5.5 | 6.0 | — |
| Di-functional monomer | Hexanediol diacrylate | 15 | 15 | 15 | 16 | 16 | — |
| Photo-polymerization initiator | 1-hydroxycyclohexylphenyl-ketone + benzophenone | 1.0 | 1.0 | 1.0 | 1.0 | 1.0 | — |
| Other additive | Defoaming agent, dispersing agent, leveling agent, etc. | 1.0 | 1.0 | 1.0 | 1.0 | 1.0 | — |
| Solvent | Pure water | 50 | 50 | 50 | 50 | 50 | — |

Physical properties of each of the prepared compounds in Examples 1 and 2 and Comparative Examples 1 to 4 were determined as follows. But, light transmission was measured after applying the compound to a PET film and the measured values have been compensated for the transmission loss due to the PET film itself.

After preparation of at least five specimens, each measurement was repeated five times for each of the specimens. The following measurement results were obtained based on the mean value calculated from the measured values, disregarding the maximum and minimum values.

(1) Wear Resistance
Determined by ASTM D 3389 standards (2) Electric Resistance
Determined by ASTM F 150 standards using PRS-801

(3) Light Transmission
Mean value of light transmissions at 350 to 700 nm measured by UV spectrometer (4) Pencil Hardness
Measured by ASTM D 3363 standards (5) Adhesiveness
Determined by ASTM D 3359-2 standards
5B: No film stripping
4B: less than 5% of film stripping
3B: 5% to 15% of film stripping
2B: more than 15% to 35% of film stripping
1B: more than 35% to 65% of film stripping
0B: more than 65% of film stripping (6) Surface Smoothness
Appearance of film after curing was observed for film smoothness
○: excellent appearance of film surface, substantially equal to a mirror surface
Δ: slightly uneven surface of a film
×: lots of lines (or creases) on the surface of a film (7) Thickness of Coating Film
Using a micrometer, thicknesses of a conductive tile before and after coating were measured and compared to each other. Thickness of the tile was also determined by SEM (scanning electron microscope) measurement. Results of the above measurements are shown in the following Table 2, in which N/A means "data not available" by the measurement.

TABLE 2

| | Examples | | Comparative Examples | | | | | |
|---|---|---|---|---|---|---|---|---|
| | 1 | 2 | 1 | 2 | 3 | 4 | 5 | 6 |
| Wear resistance (g) | <0.1 | <0.1 | <0.1 | 0.6 | 0.7 | 0.6 | 1.1 | 0.8 |
| Electric resistance (Ω) | 108 | 107 | 1010 | 108 | 1010 | 109 | 109 | 109 |
| Light transmission (%) | 85 | 80 | 90 | 85 | 90 | N/A | 70 | 90 |
| Pencil hardness | 3H | 4H | 3H | 3H | 1H | 1H | 3H | 1H |

TABLE 2-continued

|  | Examples | | Comparative Examples | | | | | |
| --- | --- | --- | --- | --- | --- | --- | --- | --- |
|  | 1 | 2 | 1 | 2 | 3 | 4 | 5 | 6 |
| Adhesiveness | 4B | 5B | 4B | 5B | 5B | N/A | 2B | N/A |
| Surface smoothness | Δ | ○ | Δ | ○ | ○ | N/A | X | X |
| Thickness of coating film (μm) | ~5 | ~5 | ~7 | ~5 | ~7 | N/A | ~12 | N/A |

As shown in Table 2, it was demonstrated that both of the coating compounds prepared by Examples 1 and 2 show excellent wear resistance and favorable antistatic effect. That is, it can be understood that the present inventive coating compounds using carbon nanotubes and fumed silica as prepared in Examples 1 and 2 have improved wear resistance and antistatic property as well as high transparency.

In contrast, although the compound prepared in Comparative Example 1 showed favorable wear resistance due to the application of fumed silica, it had a lower concentration of fine conductive particles and increased (?) electrical resistance because no carbon nanotubes were added and the coating film functioned as an insulation layer. On the other hand, it was demonstrated that the compound prepared in Comparative Example 2 exhibited good antistatic resistance but lower wear resistance while the compound prepared in Comparative Example 3 had reduced wear resistance and increased electrical resistance caused by application of neither carbon nanotubes nor fumed silica. For the conductive tile flooring material prepared in Comparative Example 4 which was not coated with the water soluble photo-curable resin compound, it was found that this material had higher electrical resistance and lower wear resistance compared to those having coating films formed of the coating compounds prepared in Examples 1 and 2, respectively.

The coating compounds prepared in Comparative Examples 5 and 6 showed different characteristics dependent on the content of pure water. Compared to the coating compound without controlling the content of pure water, the coating compound with controlled content of pure water exhibited considerably improved characteristics such as wear resistance, transparency, etc. because the film coating was of a consistent and controlled thickness. Alternatively, the coating film formed using each of the coating compounds prepared by Comparative Examples 5 and 6 showed universally deteriorated characteristics.

While the present invention has been described with reference to the preferred examples, it will be understood by those skilled in the art that various modifications and variations may be made therein without departing from the scope of the present invention as defined by the appended claims.

What is claimed is:

1. A water soluble antistatic photo-curable composition comprising:
    5 to 15 wt % of fine conductive particles containing carbon nanotubes,
    0.1 to 5 wt % of fumed silica,
    10 to 20 wt % of water soluble acrylate based oligomer,
    20 to 75 wt % of mono-functional monomer or multi-functional monomer,
    0.1 to 5 wt % of photo-polymerization initiator,
    0.1 to 5 wt % of additive including at least one selected from a group consisting of adhesion enhancer, dispersing agent, defoaming agent, leveling agent; and
    50 to 150 parts by weight of pure water relative to the total 100 weight of the above ingredients, wherein wt % is in relation to the total weight of the composition, wherein said antistatic photo-curable composition is coated 5 μm to 10 μm of wet thickness by coating process to a surface of a conductive tile having a double-layer lamination to form a coating layer of the water soluble antistatic photo-curable composition with a thickness of 3 μm to 7 μm after completely drying the solvent.

2. The antistatic photo-curable composition according to claim 1, wherein said fine conductive particles have 0.004 wt % to 80 wt % of carbon nanotubes.

3. The antistatic photo-curable composition according to claim 2, wherein said carbon nanotubes are selected from the group consisting of single-walled, double-walled and/or multi-walled carbon nanotubes treated in strong acidic and/or basic solution, which is nitric acid, a mixture of nitric acid and sulfuric acid, hydrogen peroxide, a mixture of hydrogen peroxide and ammonium hydroxide; carbon nanotubes surface-modified by an organic compound, which is one of imidazole, amine, acryl; carbon nanotubes heated at 400° C. or more for at least 2 hours; and untreated carbon nanotubes.

* * * * *